United States Patent

Fukumura et al.

Patent Number: 5,632,683
Date of Patent: May 27, 1997

[54] HOMOKINETIC JOINT HAVING BALL RETAINING STRUCTURE

[75] Inventors: Yoshikazu Fukumura, Iwata; Shin Tomogami, Shizuoka; Yutaka Tanigaki; Hiroyuki Matsuoka, both of Iwata, all of Japan

[73] Assignee: NTN Corporation, Osaka, Japan

[21] Appl. No.: 680,707

[22] Filed: Jul. 17, 1996

Related U.S. Application Data

[63] Continuation of Ser. No. 127,602, Sep. 28, 1993, abandoned.

[30] Foreign Application Priority Data

| Sep. 30, 1992 | [JP] | Japan | 4-068086 U |
| Sep. 30, 1992 | [JP] | Japan | 4-068088 U |
| Mar. 31, 1993 | [JP] | Japan | 5-073496 |

[51] Int. Cl.$^6$ ............................................... F16D 3/224
[52] U.S. Cl. ........................... 464/144; 464/145; 464/906
[58] Field of Search ............................ 464/141, 142, 464/143, 144, 145, 906

[56] References Cited

U.S. PATENT DOCUMENTS

| 3,815,381 | 6/1974 | Wagner | 464/906 X |
| 3,875,762 | 4/1975 | Tampalini | 464/906 X |
| 3,879,960 | 4/1975 | Welschof et al. | 464/145 |
| 3,928,985 | 12/1975 | Girguis | 464/144 X |
| 4,541,819 | 9/1985 | Maziotti | 464/144 |
| 4,573,947 | 3/1986 | Hazebrook et al. | 464/906 X |
| 4,832,657 | 5/1989 | Hahn | 464/906 X |

FOREIGN PATENT DOCUMENTS

| 050421 | 4/1982 | European Pat. Off. . |
| 0 050 421 A | 4/1982 | European Pat. Off. . |
| 732639 | 3/1932 | France . |
| 1360767 | 6/1963 | France . |
| 2375487 | 7/1978 | France . |
| 1150954 | 5/1969 | United Kingdom . |
| 1343282 | 1/1974 | United Kingdom . |
| 1523170 | 8/1978 | United Kingdom . |
| 1553369 | 9/1979 | United Kingdom . |

Primary Examiner—Daniel P. Stodola
Assistant Examiner—Eileen A. Dunn
Attorney, Agent, or Firm—Nikaido, Marmelstein, Murray & Oram LLP

[57] ABSTRACT

A cross-groove type homokinetic joint which requires no boot adaptor and is thus less expensive and which is provided with an arrangement for preventing the balls from dropping out while keeping a large working angle of the shaft. The cross-grooved homokinetic joint has an inner ring having grooves in its outer surface, balls received in the grooves of the inner ring, a cage retaining the balls, and an outer ring having grooves in its inner surface. The balls are guided by the grooves of the outer ring. This joint has no boot adaptor. The boot is directly fixed to the outer ring. A circlip is fitted on the inner surface of the outer ring near its open end to prevent the balls from dropping out.

1 Claim, 9 Drawing Sheets

Slide-in   Center   Slide-out

Slide-in   Center   Slide-out

HOMOKINETIC JOINT HAVING BALL RETAINING STRUCTURE

This application is a continuation of application Ser. No. 08/127,602 filed Sep. 28, 1993, now abandoned.

BACKGROUND OF THE INVENTION

1. Field of the Invention

The present invention relates to an improved homokinetic joint for use with a drive shaft of an automobile.

As one type of homokinetic joints for use with propeller shafts and drive shafts, there are known ball type cross-groove joints (VL). Such joints are used e.g. as sliding type homokinetic joint mounted inboard for front wheels and inboard and/or outboard for the rear wheels of a car.

2. Description of the Prior Art

As one example of such a homokinetic joint, we show in FIG. 14 a joint having a closed-end type mounting portion. It comprises an inner ring 1, a cage 2, balls 3 and an outer ring 4. When mounting this homokinetic joint on a shaft 5, the end of the shaft 5 is fixed to the inner ring 1 by means of a retaining ring 6 and a boot adaptor 7 and a boot 8 are fitted on the outer periphery of the shaft 5. The boot adaptor 7 is secured by caulking to the outer periphery of the outer ring 4 at its open end. Numeral 9 indicates a seal member such as an O-ring.

The boot adaptor 7 is provided to prevent the balls 3 from dropping out of ball grooves formed in the outer ring 4 and the inner ring 1 even if the angle θ becomes excessively large as shown in FIG. 15. FIG. 16 shows the relation between the angle θ and the sliding movement of the shaft. Letter A indicates the line of interference between the inner ring and the cage. B indicates the line where the balls drop out. E is the line of interference between the balls and the adaptor. F shows the line of interference between the adaptor and the shaft.

Such a conventional boot adaptor has a complicated shape and has to be manufactured with high dimensional accuracy. Further, it has to be subjected to an anti-corrosion surface treatment or made of an anti-corrosive material. Such a boot adaptor is thus very costly. Moreover, special facility is needed to caulk it to secure it to the outer ring. Such coupling work involves many steps. A seal member such as an O-ring is also needed to prevent leakage of grease. This also adds to the cost.

Such a boot adaptor is formed by pressing a steel plate and serves as a stopper by interfering with the shaft. It is so designed that the shaft will not form a larger angle than a predetermined one with respect to the outer ring while in use. But if it should operate at an excessive angle and interfere with a strong force, the boot adaptor would be deformed. This may cause insufficient coupling between the boot and the boot adaptor, thus hampering the seal therebetween.

SUMMARY OF THE INVENTION

It is an object of this invention to provide a highly versatile cross-groove type homokinetic joint which requires no boot adaptor and thus less costly, which includes means for preventing dropout of balls, and which allows the shaft to take a larger working angle.

According to the present invention, there is provided a cross-groove type homokinetic joint comprising an inner ring having grooves formed in the outer surface thereof, balls each received in the grooves in the inner ring, a cage for retaining the balls, an outer ring having an open end and formed in the inner surface thereof with grooves so as to cross the grooves in the inner ring for guiding the balls, a shaft having one end thereof coupled to the inner ring, a boot having one end thereof secured to the outer periphery of the outer ring for protecting the outer surface of the shaft, and means provided inside the open end of the outer ring for preventing the balls from dropping out.

The means for preventing the balls from dropping out may be a circlip provided on the inner surface of the outer ring near its open end.

Also, the joint may further comprise a shaft angle limiting means for limiting the angle which the shaft can take with respect to the outer ring. It may be in the form of a circlip provided on the inner surface of the outer ring at the end remote from its open end.

The shaft angle limiting means may be in the form of a circlip provided on the outer surface of the inner ring near the open end of the outer ring.

The shaft angle limiting means may be provided at the end of the inner ring near the open end of the outer ring.

The shaft angle limiting means may be in the form of a thick-walled portion provided on the inner surface of the outer ring at the end remote from its open end.

Also, a ring may be fitted on the outer periphery of the cage near the open end of the outer ring so as to function as the means for preventing the balls from dropping out and the shaft angle limiting means.

The homokinetic joint according to this invention operates in the same way as with a conventional joint. Namely, the shaft is axially slidable. But this joint requires no boot adaptor and thus is inexpensive and is simple in construction. Instead of a boot adaptor, means for preventing the balls from dropping out is provided. Since such means is provided at the limit position, the shaft can take a larger working angle than with conventional joints. This makes it possible to set the working range of the shaft to a wider angle.

BRIEF DESCRIPTION OF THE DRAWINGS

Other features and objects of the present invention will become apparent from the following description made with reference to the accompanying drawings, in which.

DETAILED DESCRIPTION OF THE PREFERRED EMBODIMENTS

Figure 1:
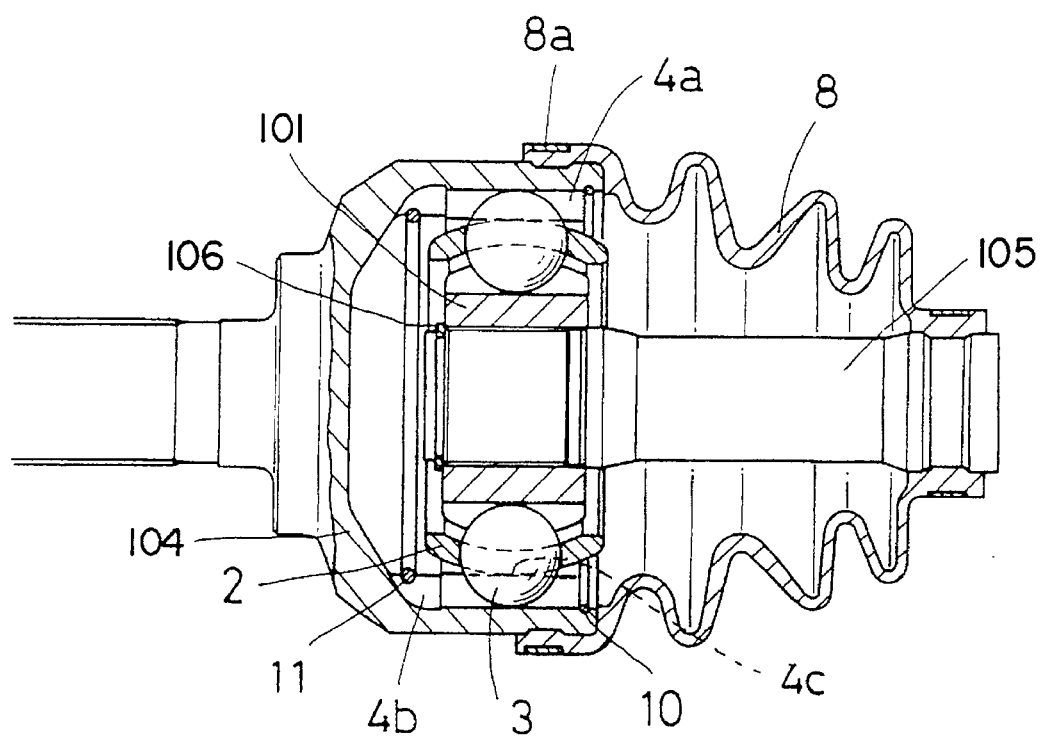
FIG. 1 is a sectional view of the homokinetic joint of the first embodiment.

FIG. 1 is a sectional view of the cross-groove type homokinetic joint of the first embodiment. It comprises an inner ring 101, a cage 102, balls 3 and an outer ring 104. The end of a shaft 105 is fixed to the inner ring 101 by means of a retaining ring 6.

In this embodiment, no boot adaptor is used. A boot 8 has its end directly fixed to the outer periphery of the outer ring 104 near its open end. Numeral 8a indicates a boot band. Instead of a boot adaptor, circlips 10 and 11 are fitted in grooves formed in the inner surface of the outer ring 104 near its open end and at its deeper part, respectively. The outer ring 104 has ball grooves 4a, a pocket 4b and an inner periphery 4c. The inner ring 1, too, has ball grooves in its outer surface so as to cross the ball grooves 4a formed in the outer ring 104.

Figure 2:
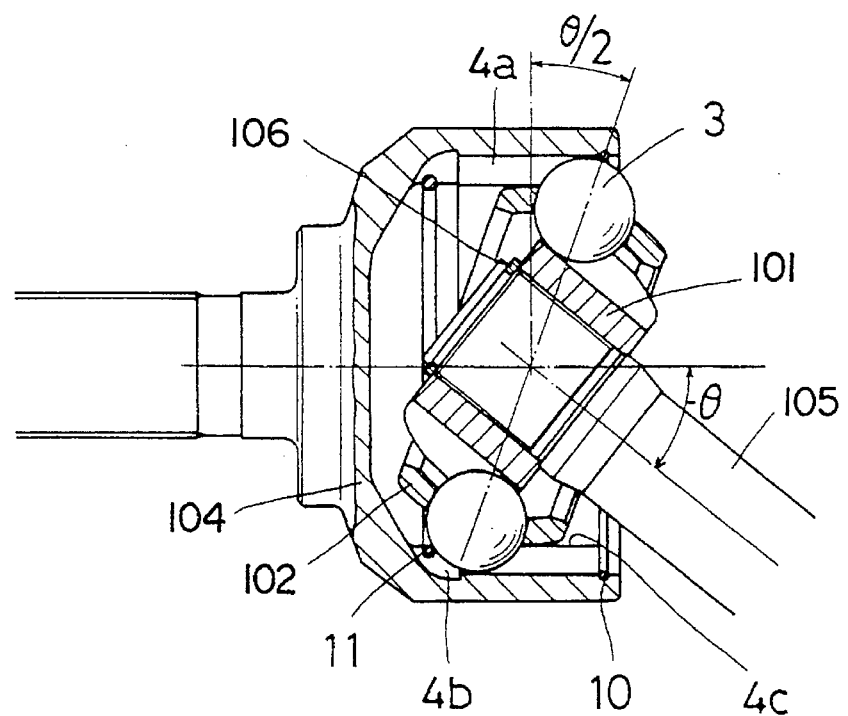
FIG. 2 is a view explaining its operation.

In the homokinetic joint of this embodiment, which uses the circlips 10 and 11, as shown in FIG. 2, when the joint is used with the shaft 105 forming an acute angle with respect to the outer ring 104, the balls 3 will abut the circlips 10 and 11, so that they are prevented from dropping out.

Figure 3:
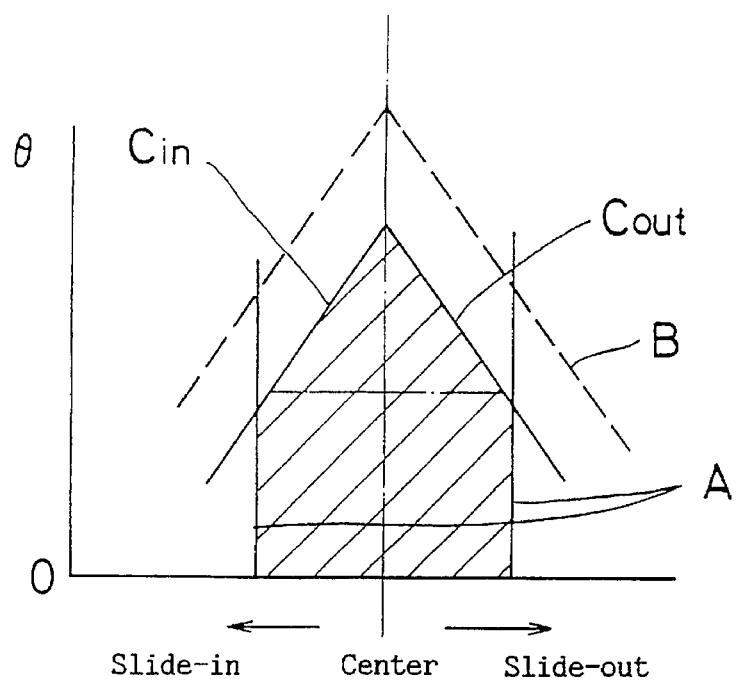
FIG. 3 is a view explaining the range of operation.

FIG. 3 shows the region where the balls drop out and the limit of interference between the balls and the inner circlip. More specifically, this figure shows the limits for both the slide-in and slide-out movements of the shaft from the reference position where the cage 102 is in the centes of the outer ring 104. Letter A indicates the lines of interference between the inner ring and the cage. B indicates the limit line where the balls drop out. Cout indicates the line of interference between the balls 3 and the circlip 10 near the open end of the outer ring 4. Cin is the line of interference between the balls 3 and the inner circlip 11.

As will be readily apparent from this figure, the shaded area shows the region used when this joint is actually mounted in a car. The triangular portion of the shaded area above the alternate long and short dash line was the portion not covered in a conventional joint.

Figure 4:
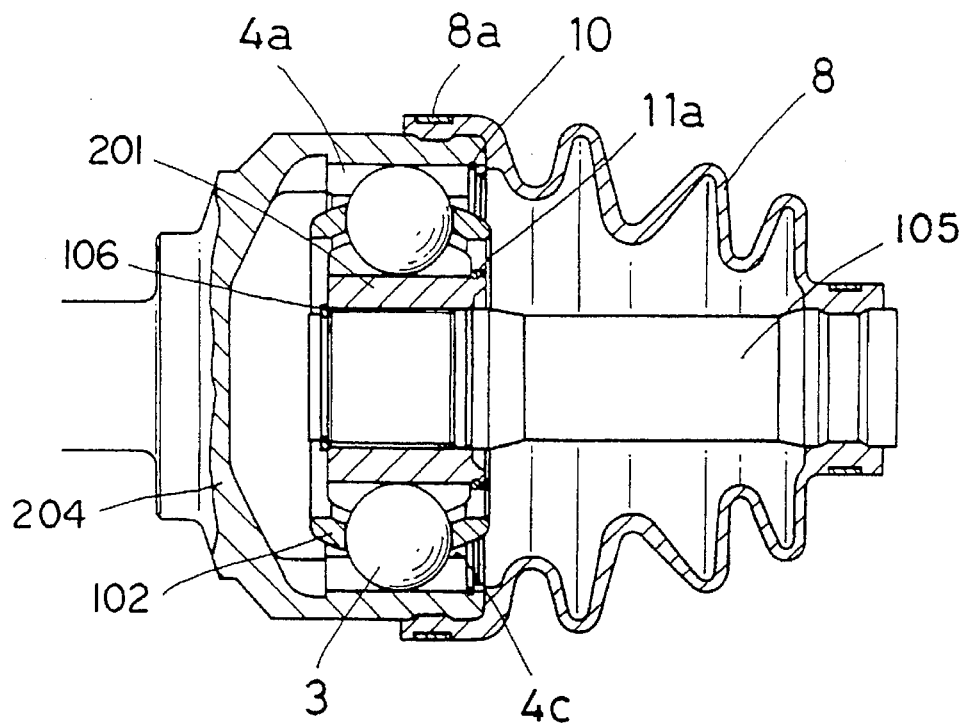
FIG. 4 is a sectional view of the homokinetic joint of the second embodiment.
Figure 5:
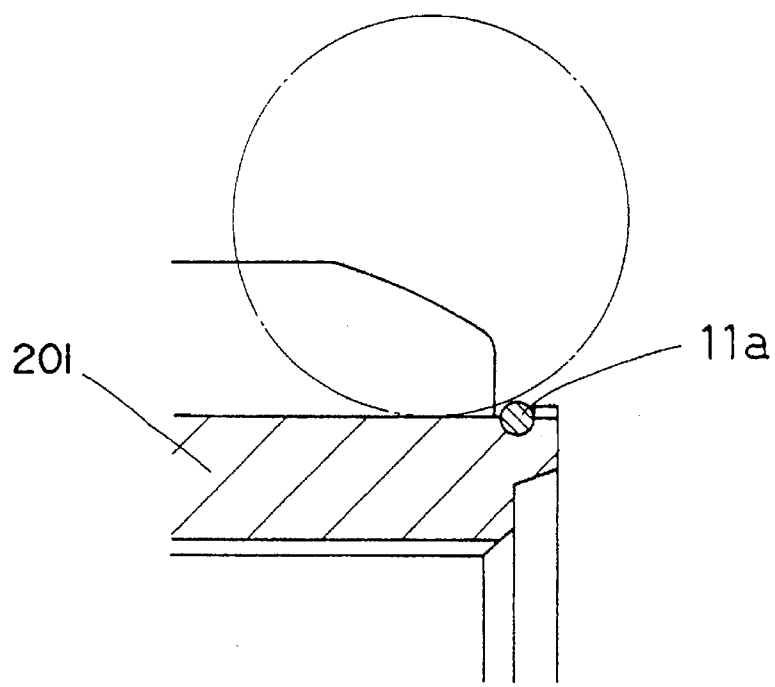
FIG. 5 is a detailed view of the circlip provided on the inner ring used.

FIG. 4 shows the second embodiment in which the same circlip 10 as shown in FIG. 1 is provided near the open end of the outer ring 204. But in this embodiment, instead of the inner circlip, a circlip 11a is fitted in a ball groove formed in the inner ring near its inlet end. FIG. 5 is an enlarged sectional view of the embodiment in which the circlip 11a is mounted on the inner ring 201.

Figure 6:
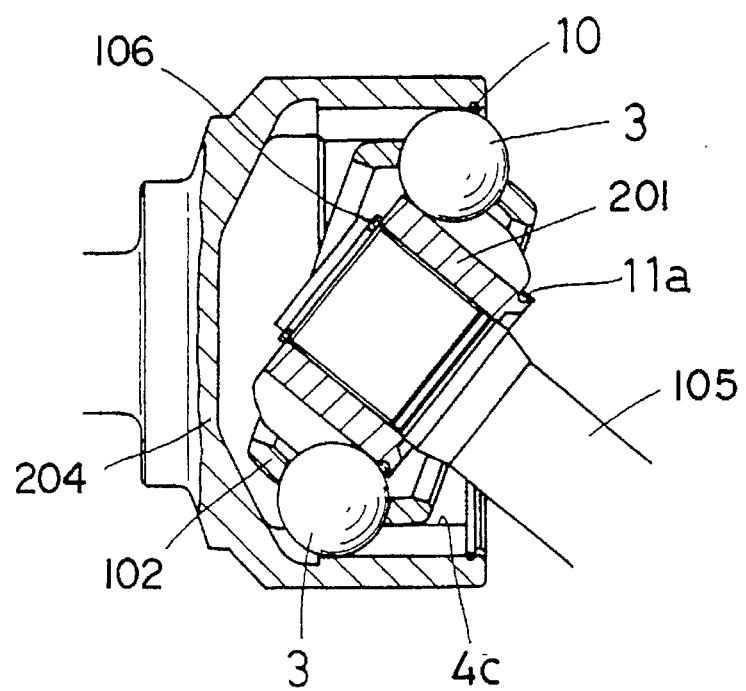
FIG. 6 is a view explaining the operation of the same.

FIG. 6 shows a state in which the shaft 105 forms a large angle with respect to the outer ring 204. The balls 3 are in abutment with the circlip 10 and 11a, so that they are prevented from dropping out of the outer ring 104 and the ball groove in the inner ring, respectively. Thus, the usable region in this embodiment is substantially as shown in FIG. 3.

Figure 7:
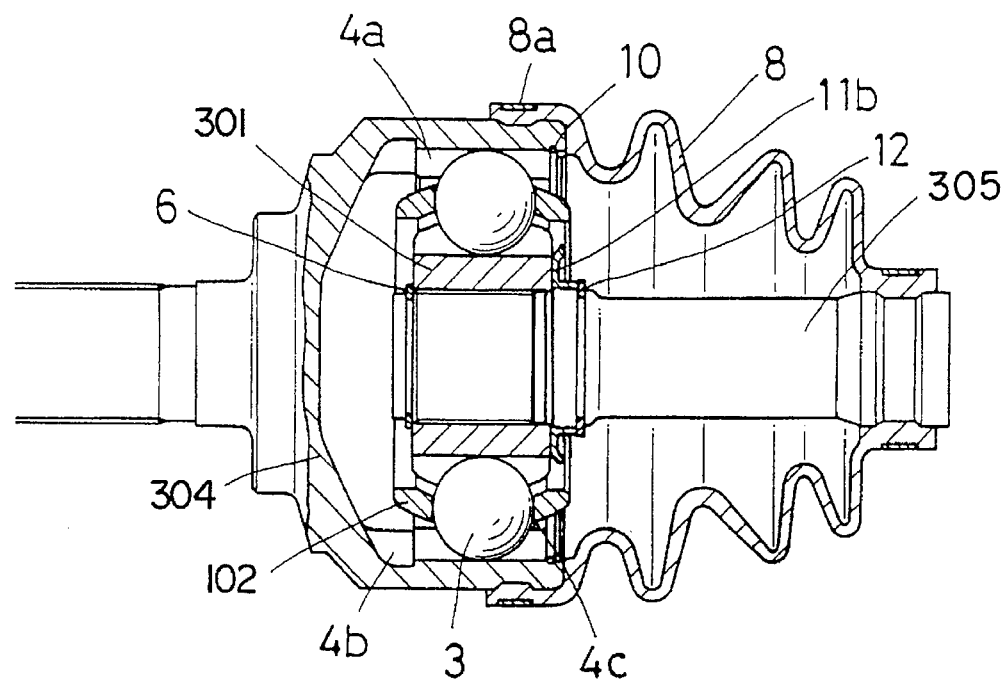
FIG. 7 is a sectional view of the homokinetic joint of the third embodiment.

FIG. 7 shows the third embodiment in which the same circlip 10 as shown in FIG. 1 is provided near the open end of the outer ring 304. But the circlip 11a shown in FIG. 4, which is provided in the ball groove in the inner ring 301 near its inlet end, is replaced with an anti-dropout ring 11b and a retaining ring 12 fitted on the shaft 305 at substantially the same position.

Figure 8A:
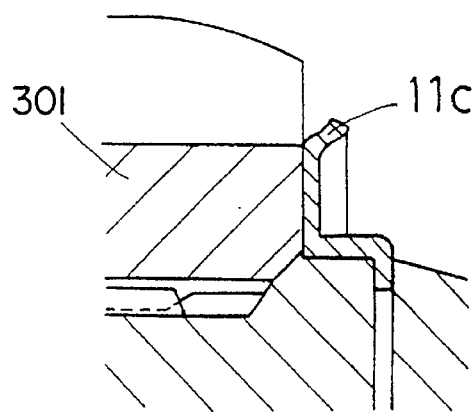
FIGS. 8A–8C are sectional views of a portion of partially modified embodiments.
Figure 8B:
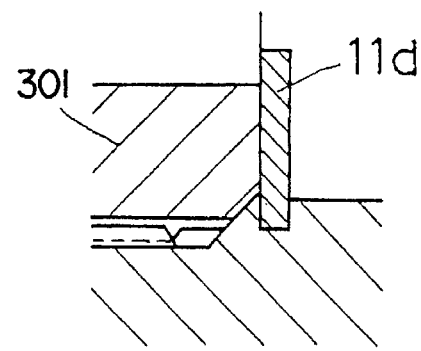
Figure 8C:
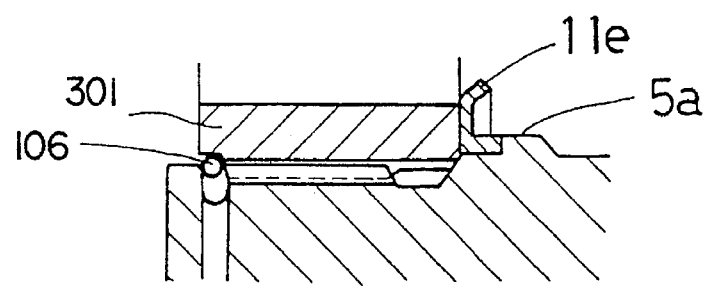

The anti-dropout ring 11b and the retaining ring 12 may be in the form of a single integral ring 11c as shown in FIG. 8A or in the form of a single large snap ring 11d as shown in 8B. Otherwise, as shown in FIG. 8C, the anti-dropout ring 11e may be held against a shoulder portion 5a of the shaft 305. In this case, the retaining ring 12 is omitted and the shaft 305 and the inner ring 301 are coupled together by means of a retaining ring 6. This is because the shaft 305 has to be inserted only after assembling the homokinetic joint.

The cross-groove type homokinetic joint of the first to third embodiments serves to transmit a turning torque in the same way as with the conventional joint. By providing the joint with means for preventing the balls from dropping out, the balls are positively prevented from dropping out even if the shaft is forming a large working angle, and thus the working range of the shaft increases. Further, since the joint requires no boot adaptor, the cost is lower.

The joints of the first to third embodiments have the shaft angle limiting means in addition to the means for preventing the balls from dropping out. The former means serves to positively limit the working range of the shaft to a predetermined level. Thus, the joint will operate more reliably.

Figure 9:
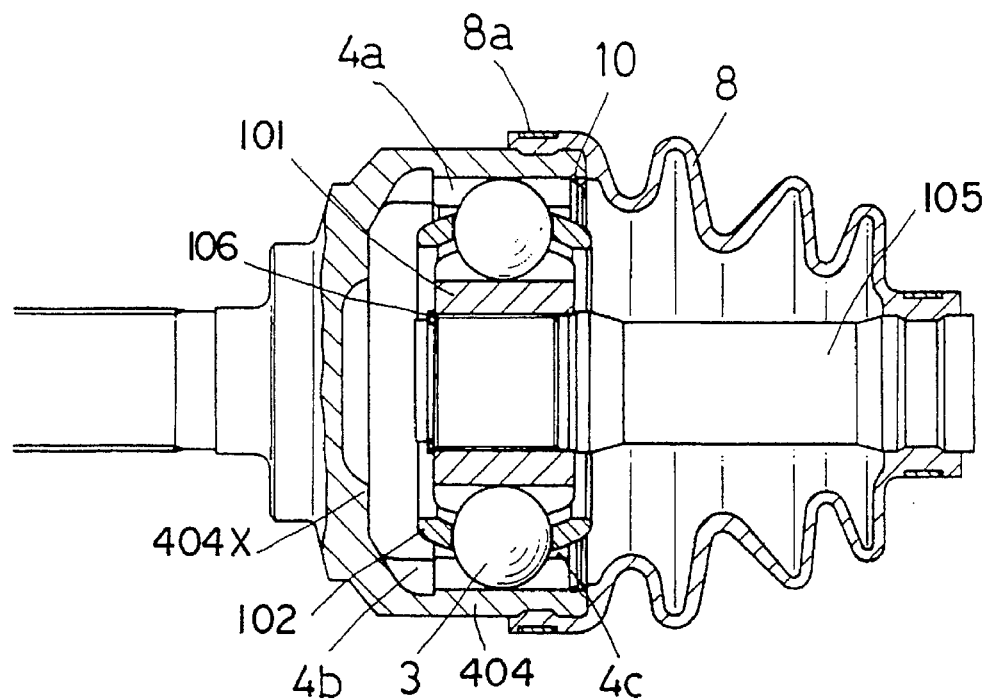
FIG. 9 is a sectional view of a homokinetic joint of the fourth embodiment.

FIG. 9 is a sectional view of the fourth embodiment. In this embodiment, too, no boot adapter is used and the end of the boot 8 is secured directly to the outer surface of the outer ring 404 by means of a boot band 8a. As in the third embodiment, a circlip 10 is mounted in a groove formed near the open end of the outer ring 404. Also, the outer ring 404 has a thick-walled portion 404x on the inner periphery thereof at its deeper part. The outer ring 404 has ball grooves 4a, a pocket 4b and an inner periphery 4c.

Figure 10A:
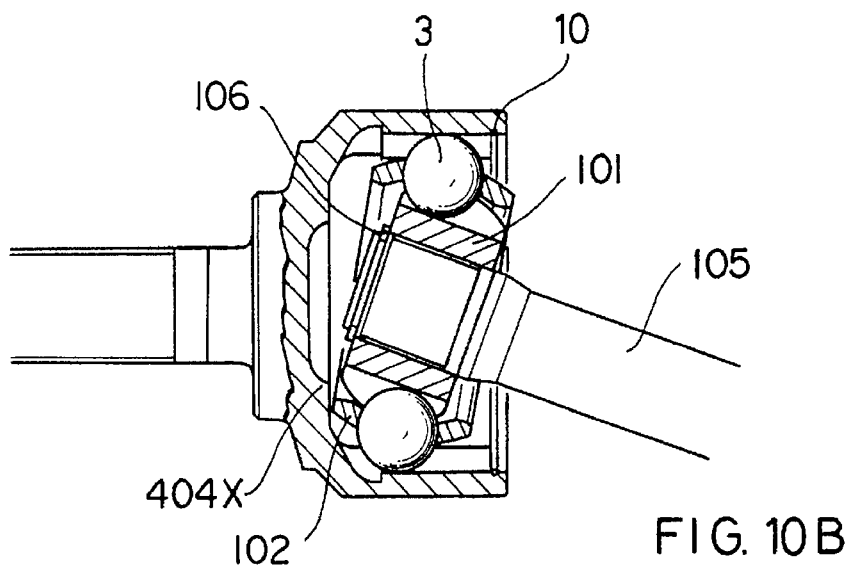
FIGS. 10A–10C are views explaining the operation of the same.
Figure 10B:
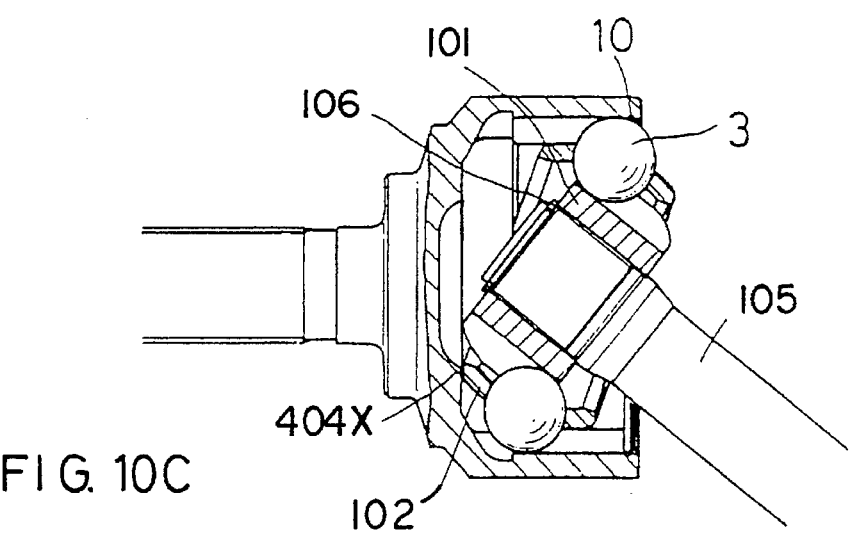
Figure 10C:
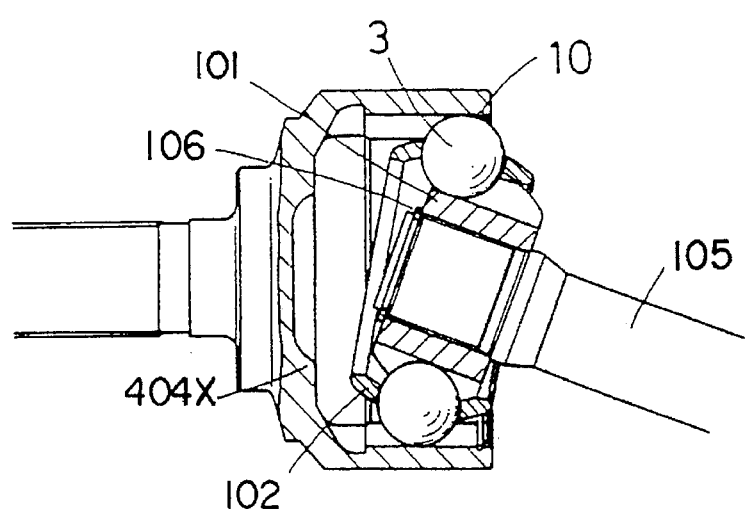

In the homokinetic joint of this embodiment, the circlip 10 provided near the open end of the outer ring 404 serves to prevent dropout of the balls. The thick-walled portion 404x provided deep inside the outer ring 404 serves as a shaft angle limiting means when the shaft slides in. FIGS. 10A–10C show how it operates.

As shown in FIGS. 10A and 10B, as the shaft slides in and the angle between the shaft 105 and the outer ring 404 increases, a cage 102 will interfere with the thick-walled portion 404x. The latter thus serves as a stopper. FIG. 10C shows that when the shaft slides out, the circlip 10 will interfere with one of the balls. Thus, the circlip serves as another stopper.

The region where the balls drop out and the limit of interference between the balls and other parts are the same as in the first embodiment.

By providing the thick-walled portion as a shaft angle limiting means on the inner periphery of the outer ring 404 at its deep portion, the balls 3 are prevented from dropping out even if the shaft is forming a large working angle, so that the working range of the shaft increases and its reliability of operation improves.

Figure 11:
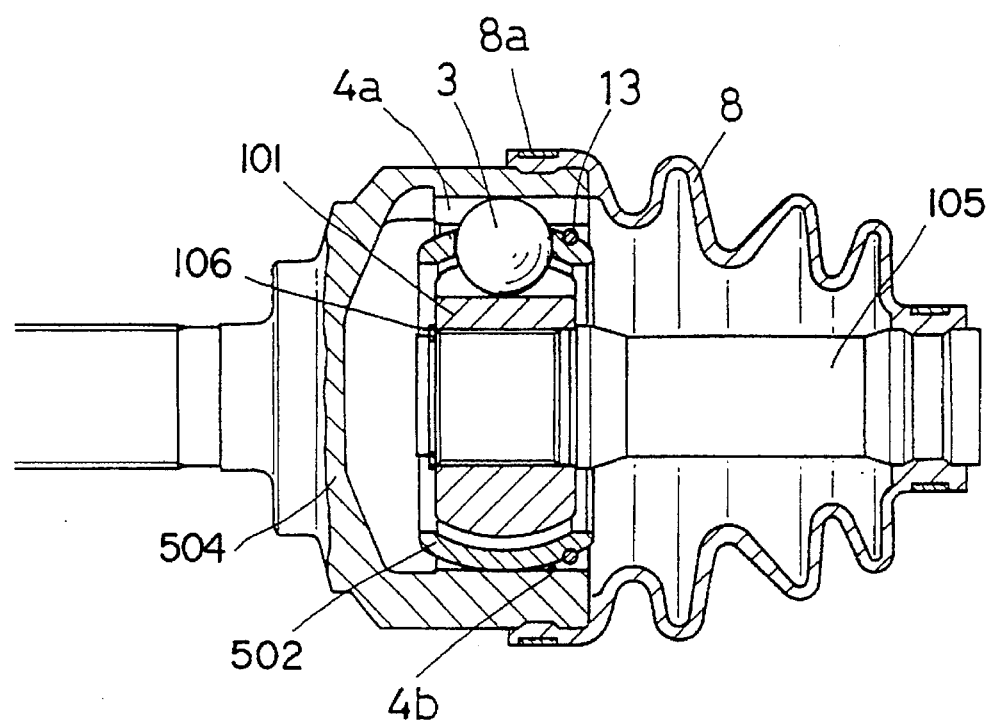
FIG. 11 is a sectional view of the homokinetic joint of the fifth embodiment.

FIG. 11 is a sectional view of the fifth embodiment. In this embodiment, too, no boot adapter is used and the end of the boot 8 is secured directly to the open end of the outer ring 505 by means of a boot band 8a.

In this embodiment, a circlip 13 is fitted in a groove formed in the outer surface of the cage 502 near the open end of the outer ring 504.

Figure 12:
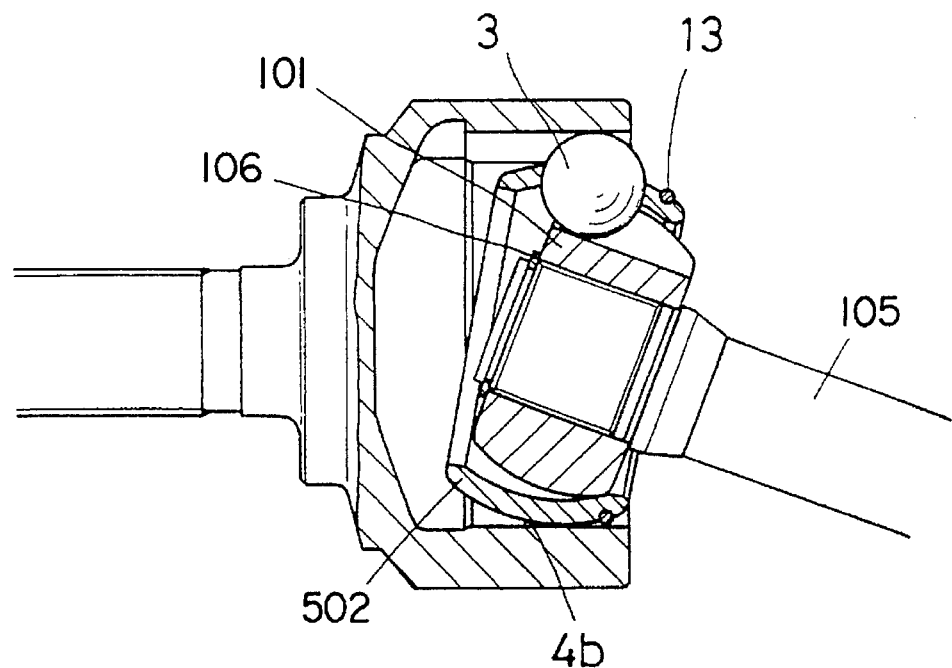
FIG. 12 is a view explaining the operation of the same.

In the homokinetic joint of this embodiment, a circlip 13 serves to limit the working angle of the shaft throughout the entire sliding region and also serves to prevent dropout of the balls. FIG. 12 shows how it operates.

Figure 13:
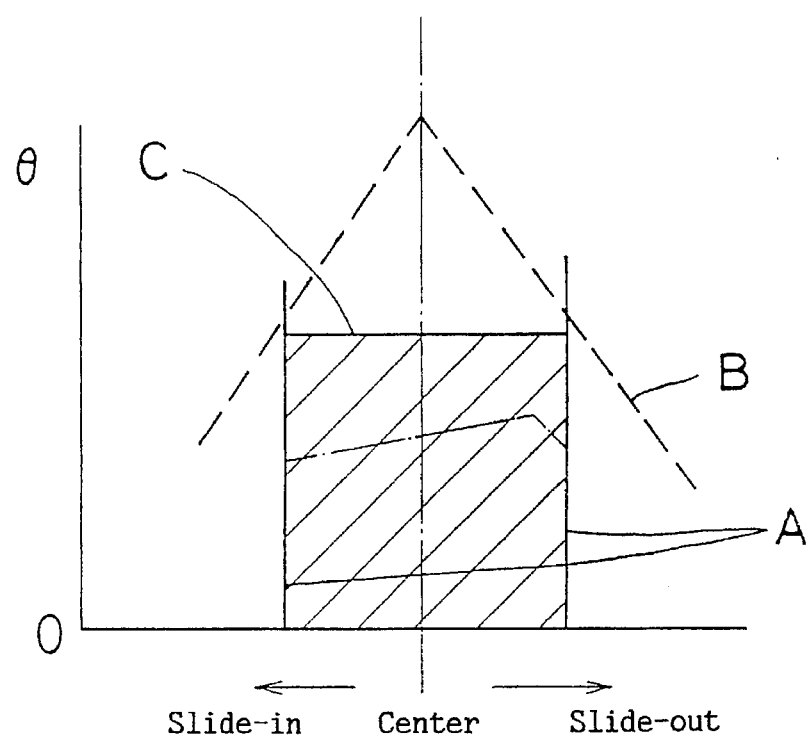
FIG. 13 is a view explaining the range of operation.
Figure 14:
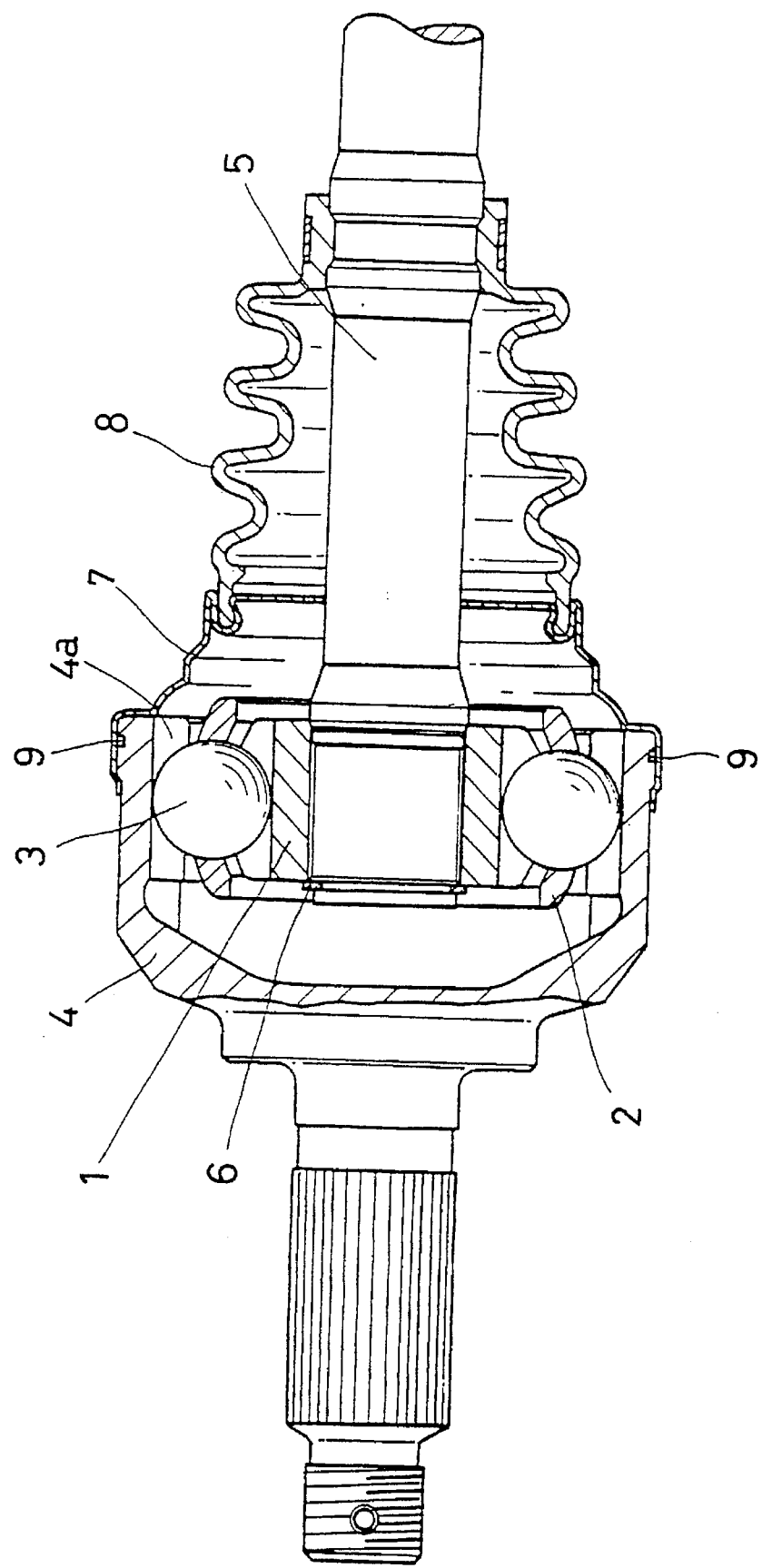
FIG. 14 is a sectional view of a conventional homokinetic joint.
Figure 15:
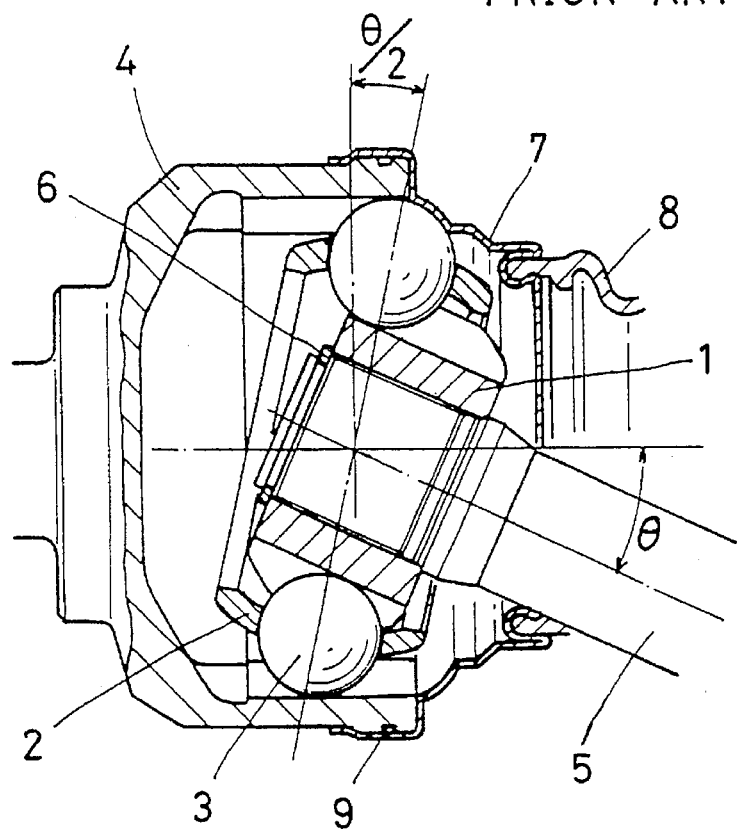
FIG. 15 is a view explaining its operation.
Figure 16:
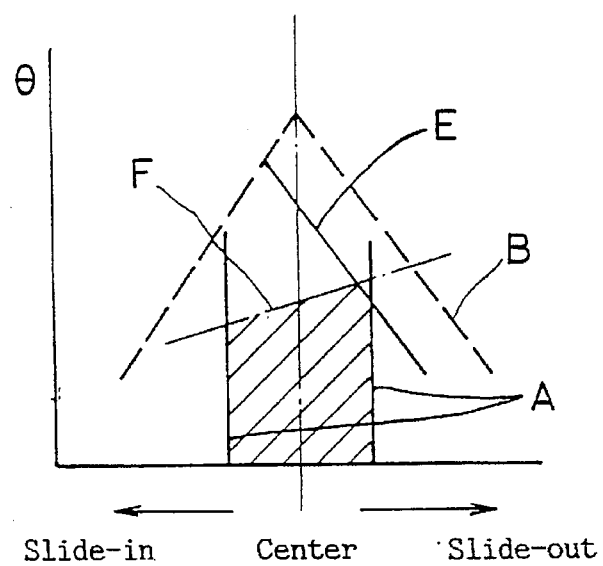
FIG. 16 is a view explaining the range of operation.

FIG. 13 shows the region where the balls drop out and the limit of interference between the outer ring inner periphery and the circlip 13. More specifically, this figure shows the limit of the movement when the shaft slides in and out from the reference position where the cage 502 is in the center of the outer ring 504. Letter A indicates the lines of interference between the inner ring and the cage. B indicates the limit line where the balls drop out. C indicates the line of interference between the outer ring outer periphery and. the circlip.

As will be readily apparent from this figure, the shaded area shows the region used when this joint is actually mounted in a car. The triangular portion of the shaded area above the alternate long and short dash line was the portion not covered in a conventional joint.

By providing the cage with the means for preventing the balls from dropping out and the shaft angle limiting means, the balls are prevented from dropping out even if the shaft is forming a large working angle, its working range increases, and it operates more reliably. Further, since this joint has no boot adaptor, its cost is low.

What is claimed is:

1. A non-parallel groove type homokinetic joint comprising an inner ring having grooves formed in the outer surface thereof, at least two balls, one of said at least two balls is received in said grooves in said inner ring, a cage for retaining said balls in said inner ring, an outer ring having an inner surface thereof with grooves formed on said inner surface, said grooves of said outer ring being disposed on a longitudinal axis which crosses a longitudinal axis of said grooves in said inner ring for guiding said balls, said outer ring having an open end thereof, said homokinetic joint further comprising a shaft having one end thereof mounted in and coupled to said inner ring, and a shaft angle limiting means for limiting the angle which said shaft takes with respect to said outer ring to a predetermined angle and for preventing said balls from dropping out of both said grooves in said inner ring and said outer ring, said shaft angle limiting means comprising a first circlip provided on the inner surface of said outer ring near said open end, and a second circlip provided on the outer surface of said inner ring near said open end, said first and second circlips being so positioned that when said shaft takes said predetermined angle with respect to said outer ring, said first and said second circlips come into contact with two of said balls, respectively, to prevent a ball of said two balls in contact with said first circlip from dropping out through said open end and the other ball of said two balls in contact with said second circlip from moving further into said outer ring.

* * * * *